United States Patent [19]

Walenta

[11] 3,794,987

[45] Feb. 26, 1974

[54] MFM READOUT WITH ASSYMETRICAL DATA WINDOW

[75] Inventor: Ivan Earl Walenta, Westlake, Calif.

[73] Assignee: Burroughs Corporation, Detroit, Mich.

[22] Filed: Nov. 1, 1972

[21] Appl. No.: 302,915

[52] U.S. Cl. .......... 360/43
[51] Int. Cl. .......... G11b 5/02
[58] Field of Search .......... 340/174.1 H, 174.1 B, 340/174.1 A; 328/63

[56] References Cited

UNITED STATES PATENTS

| | | | |
|---|---|---|---|
| 3,656,149 | 4/1972 | Sirvastavz et al. | 340/174.1 H |
| 3,737,895 | 6/1973 | Cupp | 340/174.1 H |
| 3,689,903 | 9/1972 | Agrawals | 340/174.1 H |
| 3,636,536 | 1/1972 | Norris | 340/174.1 H |
| 3,684,967 | 8/1972 | Kelly | 340/174.1 H |
| 3,609,560 | 9/1971 | Greenberg | 340/174.1 H |

*Primary Examiner*—Vincent P. Canney
*Attorney, Agent, or Firm*—Albin H. Gess; Benjamin F. Spencer; Edward G. Fiorito

[57] ABSTRACT

In the data retrieval system utilizing a recording medium with digital data encoded in accordance with a modified frequency modulation (MFM) encoding scheme, an encoded data detection method and apparatus utilizes an assymetrical data window, the longer time period window for the binary "one" information, to retrieve the recorded data. The length of this longer time period window and its occurrence in time is selectively adjusted until a minimum error ratio for the recovery process is obtained. The MFM encoded data, recovered from the recording medium is detected by the skewable assymetrical data windows, the detected data converted to NRZ encoded digital data to be supplied to an NRZ discrimination circuit and then to a utilization circuit.

10 Claims, 4 Drawing Figures

MFM READOUT WITH ASSYMETRICAL DATA WINDOW

BACKGROUND OF THE INVENTION

The present invention relates generally to improvements in encoded data storage and retrieval systems and more particularly pertains to new and improved modified frequency modulated (MFM) encoded data retrieval systems wherein assymetrical data window signals are generated for use in retrieving the MFM encoded data.

One of the problems obtaining a high degree of interest from the data processing industry is the problem of providing extremely high data bit packing densities when storing data on a magnetic medium with a minimum of error or loss when retrieving such data. As higher and higher packing densities for digital data are used such deleterious manifestations as pulse crowding, peak shifting and amplitude variations become a critical problem to the detection of stored data signals. Of the many modulation and coding techniques that are being used for coding digital data to improve the storing capabilities of magnetic mediums and to minimize the problems attandant with high packing densities, one technique known as modified frequency modulation (MFM) was found to be promising.

In a storage and retrieval system using MFM encoded data, the digital data is represented by flux transitions on a magnetic medium so that each bit of data is stored in a particular bit cell or time period with a first binary value, which may be a binary "one," having a flux transition at the mid-point of a bit cell and the second binary value, a binary "zero,"having a flux transition at the leading edge of its bit cell, except when the binary zero immediately follows a binary one, in which case there is no flux transition for the binary "zero." The binary "zero" and "one"transitions on the magnetic medium may be used to synchronize a clock pulse generator. Therefore, the MFM encoded data is considered a self-clocking scheme. MFM encoded data has advantages over other types of encoding such as FM and PM because the MFM encoding scheme utilizes fewer flux transitions to represent the same binary data bit pattern than these other encoding schemes. This permits more binary data to be packed into a certain length of magnetic medium while still leaving a safe spacing for the flux transitions.

The use of MFM encodes signal data at high packing densities, however, exhibits the characteristic or peak shift of the flux transitions recorded on the magnetic medium. To help alleviate this peak shift problem, the prior art has recognized that by using an assemetrical clock signal for strobing the MFM encoded data from the magnetic medium, the longer time period clock being used to strobe out the binary ones and the shorter time period clock being used to strobe out the binary zeros, a considerably higher packing density, as compared to the above-mentioned encoding techniques, can be achieved while still keeping the error ratio in the recovery process within a tolerable margin.

The prior art, by use of the assymertrical clock signal, taken into account the inherent characteristic of MFM encoded data to shift a predictable amount and direction. The prior art does not, however, take into account the randomness factor of these peak shifts, also exhibited by the recovered MFM encoded data. It has been determined that factors additional to the packing density contribute to the phenomena of peak shift in the signals representing the recovered encoded data. These factors include, for example, non-symmetry of the read head windings and the rise time of the write wave form used during storage.

In addition to the prior art's lack of consideration for these additional actors contributing to peak shift, the prior art systems for encoding data recovery are quite complex in approach, therefore providing a less reliable and more expensive working system.

SUMMARY OF THE INVENTION

It is therefore an object of this invention to provide an improved MFM encoded digital data recovery method and apparatus that has a smaller error recovery ratio than prior art systems.

Another object of this invention is to provide an MFM encoded digital data recovery apparatus that is straightforward, more reliable, and relatively inexpensive to implement.

These objects and the general purpose of this invention are accomplished by utilizing a first monostable multivibrator to establish the start of the longer time data window in response to a clock signal and a second monostable multivibrator to establish the end of the longer time data window in response to the output of the first monostable multivibrator. By selectively varying the time constant of the two multivibrators, the start and end of the longer time data window may be varied as desired. This longer time data window is utilized to detect the MFM encoded data which is then converted into NRZ encoded data.

DESCRIPTION OF THE DRAWINGS

Other objects and many of the attendant advantages of this invention will be readily appreciated as the same becomes better understood by reference to the following detailed description when considered in connection with the accompanying drawings in which like reference numerals designate like parts throughout the figures thereof and wherein.

DESCRIPTION OF THE PREFERRED EMBODIMENTS

Figure 1:
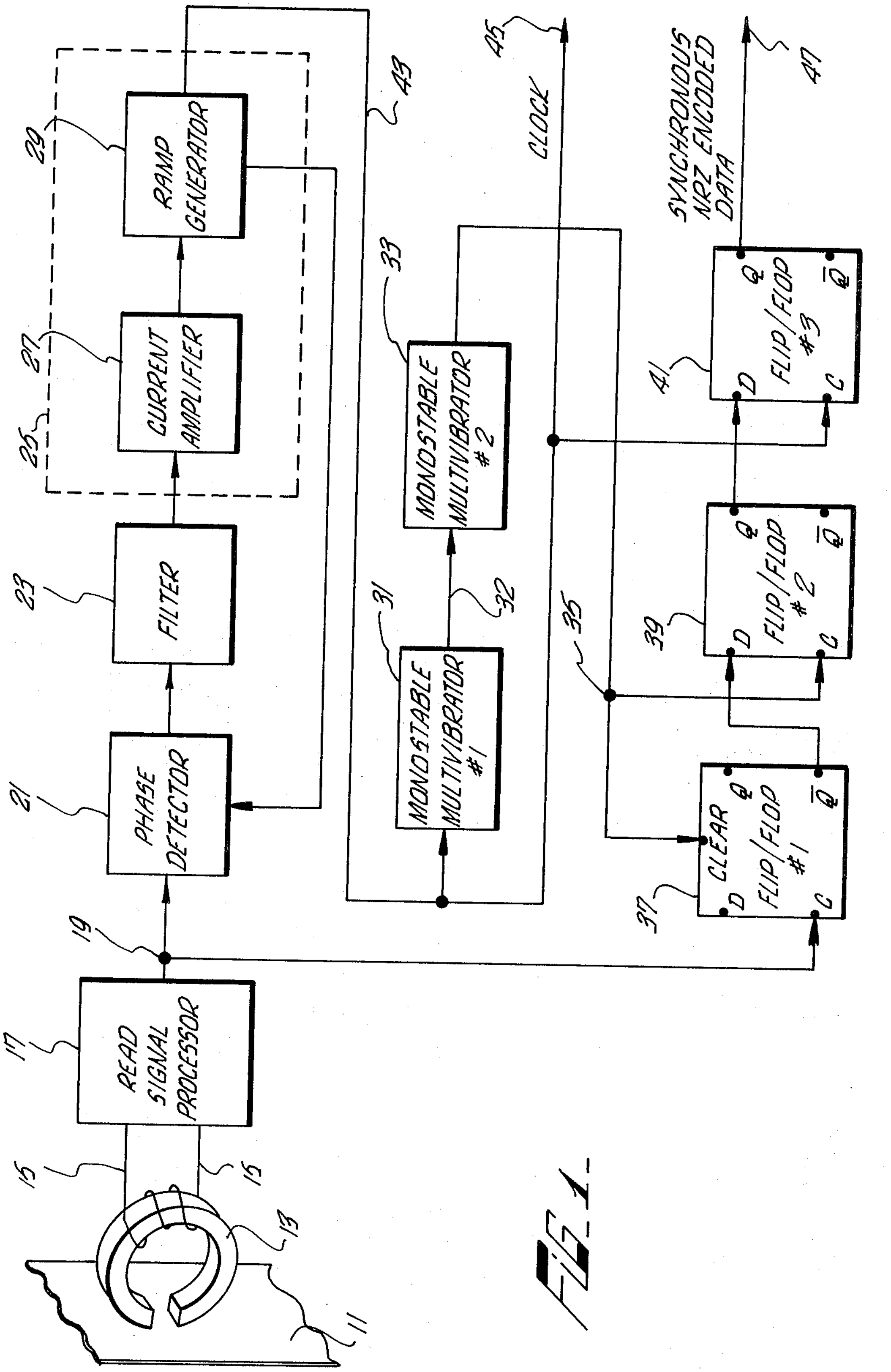
FIG. 1 is a block diagram illustration of a data recovery system utilizing a preferred embodiment of the invention.

FIG. 1 which illustrates an encoded digital data recovery system utilizing a preferred embodiment of the present invention shows a magnetic medium 11 such as a disk or tape, or the like, used as the storage medium and a transducer 13 for removing data from the magnetic medium 11. Because a magnetic medium was used as an example of the storage medium, the data is stored as flux transitions that are sensed by the transducer 13. The sensed fluxed transitions are manifested in the lines 15 leading from the transducer 13 to a read signal processor 17 by a small current flow.

The signal processor circuit 17 filters out low amplitude noise signals and responds to the flux transitions on the magnetic medium as detected by the read head 13 to provide a narrow positive going pulse at the point in time of each occurence of such transition. The output of the read signal processor 17 can be considered the raw MFM data which is supplied over line 19 to a phase detector 21 and number 1 flip-flop 37.

Phase detector 21 is the first element in a phase lock loop circuit that comprises a filter 23 and a variable frequency oscillator 25, the variable frequency oscillator itself made up of a current amplifier 27 and a ramp generator 29. The phase detector 21 receives the incoming raw data and a ramp output of the ramp generator 29.

The ramp output signal of the ramp generator 29 may consist of vertical transitions from negative to positive polarity followed by sloping transitions from positive to negative polarity at a base frequency which is the frequency at which data is recorded on the magnetic medium on at twice such a base frequency. If the ramp output of the ramp generator is twice the base frequency, it is divided down in a well known manner to produce a ramp signal at the base frequency.

The phase detector 21 provides an output voltage to the filter 23 which is an indication of the variance in time of occurrence of the arrival of a row data bit and the occurrence of the midpoint of the ramp signal received. If there is coinicidence between the arrival of a raw data bit and the occurrence of the midpoint of a ramp signal, the phase detector provides a zero phase signal to the filter 23. Thus, it can be seen that the further the raw data bits preceed or follow the midpoint of the ramp signal the generator is the voltage output of the phase detector in a respective positive or negative direction.

The filter 23 simply smoothes the voltage output of the phase detector 21 so that sudden changes are attenuated and supplies a smooth voltage signal to the current amplifier 27 in variable frequency oscillator 25. The current amplifier 27 responds to the output of the filter 23 to supply an error current corresponding to the error voltage input signal. This error current is supplied to the ramp generator 29 and controls the frequency of the ramp generator. In effect then, the variable frequency oscillator 25 will produce a ramp output signal that will speed up in response to a positive error voltage from filter 23 and slow down in response to a negative error voltage from filter 23. This operation is commonly known in the art as a type I phase loop which is overall effect causes the variable frequency oscillator 25 to gradually move into more exact synchronism with the frequency of the retrieved data signals.

The ramp generator 29 in the variable frequency oscillator 25 also has a pulse output signal on line 43 which has the same frequency as the ramp output signal and responds to the incoming data bit cells in the same manner as above described in relation to the ramp output signal. This pulse output signal can be called the clocking output signal of the variable frequency oscillator 25. This clocking output signal is supplied to number one monostable multivibrator 31 over line 43 causing that multivibrator to change to its unstable state and generate an output on line 32 which causes number two monostable multivibrator 33 to change to its unstable state. It is desriable that both monostable multivibrators 31 and 33 have very fast rise time responses and therefore should be constructed of emitter coupled logic (ECL) or the like. These two multivibrators generate a data window for decoding the binary ones in the MFM encoded data recovered from the magnetic medium.

The raw MFM data from the read signal processor 17 is supplied to number one flip-flop 37 which is a well known "D" flip-flop or the like which also may be constructed of ECL logic. In addition to the raw data, number one flip-flop 37 receives the window signals generated by the two monostable multivibrators 31 and 33. Number one flip-flop 37 operates in conjunction with number two flip-flop 39 to detect the MFM encoded data in response to the window signals generated by the number one and number two monostable multivibrators 31 and 33, respectively and convert them to NRZ encoded data. This NRZ encoded data is supplied to number three flip-flop 41 which also receives the clock signals from ramp generator 29 over line 43 to synchronize the NRZ encoded data with a clock signal. The clock pulses on line 45 and the NRZ encoded data on line 47, synchronized with the clock pulses on line 45 are supplied to an NRZ decoding circuit, which is well known in the art, and then to a utilization circuit.

Figures 2, 3:
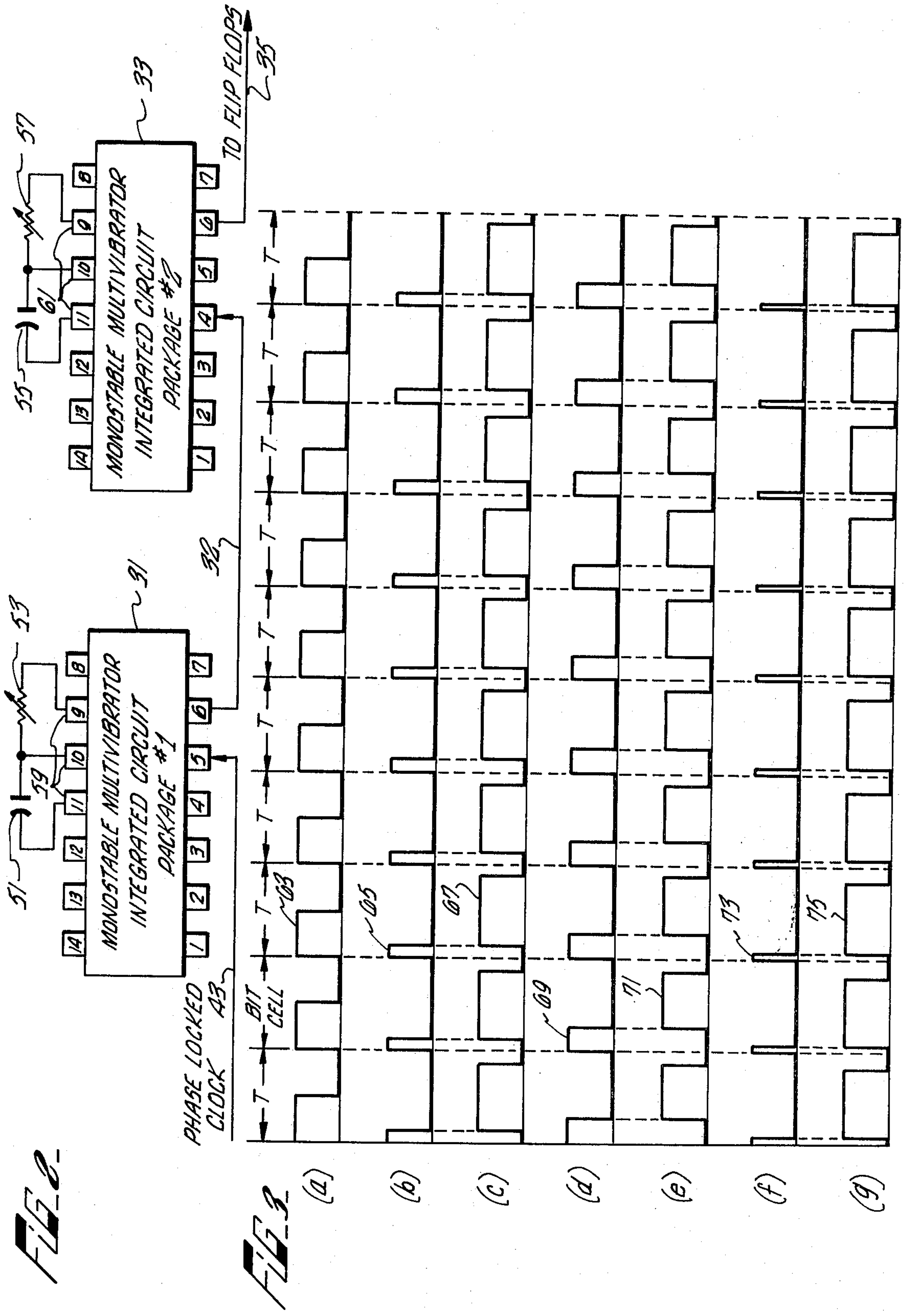
FIG. 2 illustrates schematically, a preferred embodiment of several of the elements of the present invention.
FIG. 3 is a pulse diagram illustration of the functional operation of the elements of FIG. 2.

Referring now to FIG. 2, it is assumed, for illustration purposes, that the monostable multivibrators 31 and 33 are packaged as illustrated in FIG. 2, in a black box configuration with 14 connecting tabs thereto. As is well known, the internal timing circuit of a monostable multivibrator determines the length of its output pulse once it has been triggered. To selectively vary the length of the output pulse of a monostable multivibrator such as multivibrator 31, a capacitor-resistor pair is connected to the number 11, 10 and nine timing tabs 59 on the multivibrator package. Thus, external capacitor 51 and variable resistor 53 are connected to the timing tabs 59 of the number one monostable multivibrator 31, and external capacitor 55 and variable resistor 57 are connected to the timing tabs 61 of the number two monostable multivibrator 33. The check signal from the variable frequency oscillator 25 (FIG. 1) is supplied to number one monostable multivibrator 31 over line 43.

This monostable multivibrator responds to the positive rise of its input signal, causing it to trigger and have an output signal on line 32 which signal is supplied to an input of the second monostable multivibrator 33 which response to a negative signal transition. Therefore, when number one monostable multivibrator 31 times out, its output signal will fall, causing number two monostable multivibrator 33 to trigger generating an output signal on line 35 that is supplied to number one and number two flip-flops 37, 38 (FIG. 1).

Referring now to FIG. 3, three examples of the functional interrelationship of number one monostable multivibrator 31 and the number two monostable multivibrator 33 to produce an assymetrical window signal are illustrated. Assume that a clock signal 63, as illustrated at (*a*) of FIG. 3, is received on line 43 by number one monostable multivibrator 31. This clock signal has a symmetrical high and low value during one bit cell or bit time period, as illustrated. Therefore, it is at the base frequency of the recovered data. The output of number one monostable multivibrator 31 will be a series of narrow pulses 65 as illustrated at (*b*), the time period or width of these pulses being determined by the setting of external variable resistor 53 on number one monostable multivibrator 31. Number two monostable multivibrator 33 responds to the number one multivibrator output signal 65 during a decrease in the level of the signal to generate an output signal 67 on line 35, as illustrated at (*c*) of FIG. 3. The width of the pulses in this signal 67 are determined by the setting of the external variable resistor 57 connected to number two monostable multivibrator 33. The output of number two monostable multivibrator 33 on line 35 is the asymetrical window signal that is used in detecting the raw MFM data recovered from the electromagnetic medium by the system of FIG. 1. As can be seen from the signal 67, at (*c*), the timing of the two monostable multivibrators 31 and 33 has been adjusted so that the output of the number two monostable multivibrator 33 has a first timed portion at one polarity centered in a bit period that is greater than a second timed portion of a different polarity centered around the boundary of a bit cell.

The centering of the first timed portions and second timed portions with respect to the bit cells need not necessarily be the case, however, as for example illustrated at (*d*), (*e*), (*f*) and (*g*) of FIG. 3. By adjusting the external variable resistor 53 on the number one monostable multivibrator 31 to increase the time constant of that multivibrator, a pulse train 69, as illustrated at (*d*) will appear on line 32.

If the external variable resistor 57 on number two monostable multivibrator 33 is not varied, the time constant of number two monostable multivibrator 33 will remain the same, causing it to time out at the same point as in example (*c*), thereby producing a pulse train 71 on line 35, as illustrated at (*e*) of FIG. 3. As can be seen from this pulse train, the output of number two monostable multivibrator 33 is still assymetrical with a first timed portion being greater than a second timed portion. However, the respective timed portions are no longer centered with respect to the bit cell time periods; this, in effect, producing a skew of both timed portions, while at the same time varying the ratio of the first and second timed portions of the window signal.

As a third example, consider the situation where the external variable resistor of the first monostable multivibrator 53 and the external resistor 57 of the second monostable multivibrator are varied an equivalent amount in the same direction, thereby producing an equivalent decrease in the width of the output pulses of their respective multivibrators. This being the case, signal output 73 of the number one monostable multivibrator 31 would appear on line 32, as illustrated at (*f*) of FIG. 3. In response to these pulses, number two monostable multivibrator 33 would generate a signal 75 on output line 35, as illustrated at (*g*) of FIG. 3. It can be seen from the signal 75 at (*g*), the ratio of the first timed portion of the pulse output signal with respect to the second timed portion of the pulse output signal has not changed from the ratio exhibited by signal 67 at (*c*). However, the first timed portion and the second timed portion of the pulse train signal have been skewed consider-ably to the left.

From this explanation of the function of the two multivibrators 31 and 33, it can be seen that an assymetrical pulse signal is generated by relatively uncomplicated circuitry that permits the skewing of the assmytrical pulses generated, in one direction or another, and the variation of the ratio of the first timed portion with respect to the second timed portion of the generated pulse train.

Figure 4:
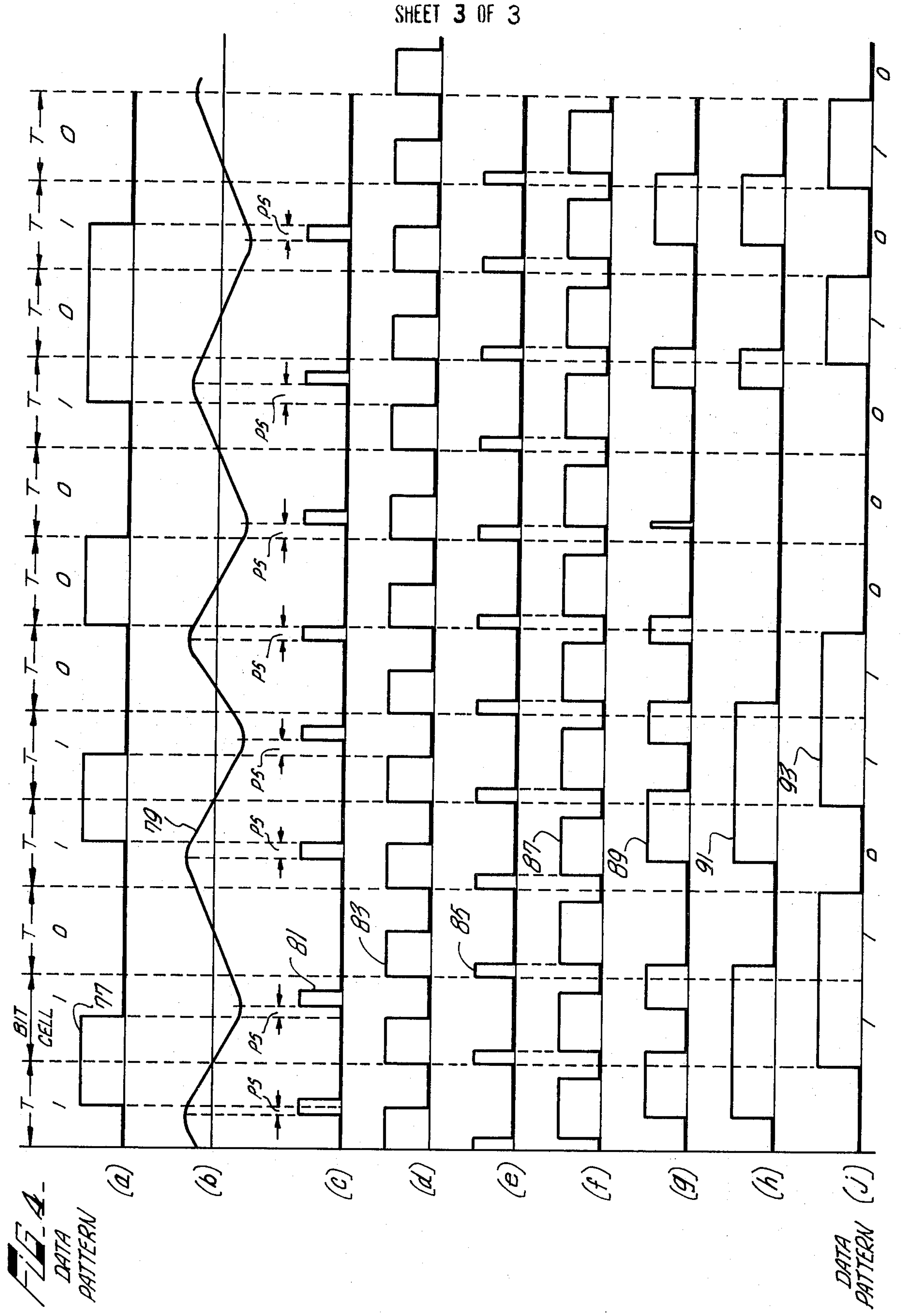
FIG. 4 is a wave form diagram illustration of the functional relationship of the various circuits in the preferred embodiment of FIG. 1.

Referring now to FIG. 4, an explanation of the functional relationship of the apparatus of FIG. 1 in decoding the MFM data will be given. Assuming that the data pattern written on the magnetic medium 11 (FIG. 1) is as illustrated at the top of FIG. 4 and is written as a series of flux transitions 77, illustrated at (*a*) of FIG. 4, the signal output of the transducer 13 (FIG. 1) is a varying level signal 79, illustrated at (*b*) of FIG. 4. The transducer output signal 79 is applied to the read signal processor 17 (FIG. 1) which generates signals illustrated by the pulse train 81 at (*c*) of FIG. 4. This pulse train represents the raw MFM encoded data recovered from the magnetic medium. It can be seen from this pulse train that each of the data pulses has experienced some degree of peak shift. This has occurred because the data pattern example chosen is the worst case peak shift pattern for MFM encoding. The pulse train 81 at (*c*) is supplied to number one flip-flp 37 (FIG. 1). A variable frequency oscillator 25 (FIG. 1) supplies number one monostable multivibrator 31 (FIG. 1) with a data clock signal 83, as illustrated at (*d*) of FIG. 4. The number one monostable multivibrator 31 generates a signal 85 illustrated at (*e*), the time duration of each pluse therein being determined by a manual adjustment on number one monostable mulvitibrator 31 (FIG. 1). In response to this pulse train 85, number two monostable multivibrator 33 (FIG. 1) generates the signal 87 illustrated at (*f*) of FIG. 4, the time duration of each pluse in that signal being determined by the external timing adjustment on number two monostable multivibrator 33. This signal 87 can be called the assymetrical data window signal that is used to detect the raw MFM data. The window signal 87 is applied to number one flip-flop 37 (FIG. 1) and number two flip-flop 39 (FIG. 1) over line 35.

Number one flip-flop 37 receives the raw MFM data at its clock (C) input and the assymetrical window signal from monostable multivibrator 33 at its clear input. Number one flip-flop 37 responds to the positive transition of the signals at both its clear and clock inputs. The flip-flop 37 has complementary outputs Q and $\bar{Q}$, a relationship that is well known for a "D" flip-flop or the like. A $\bar{Q}$ output of number one flip-flop 37 will therefore be a signal 89 as illustrated at (*g*) of FIG. 4. In response to the positive transition on the window signal 87 from number two monostable multivibrator 33 the $\bar{Q}$ output of number one flip-flop 37 goes to zero if it was formerly in the one state or stays at zero if it was formerly in the zero state. At the occurrence of a positive transition on the raw MFM data signal 81, the $\bar{Q}$ output will go to a binary one state since it had previously been set to a binary zero state by a positive transition in the window signal 87. This interrationship generates the signal 89 illustrated at (*g*) of FIG. 4.

Number two flip-flop 39 (FIG. 1) receives the signal from the output of number one flip-flop 37 at its data input (D) and receives the assymetrical window signal 87 at its clock input (C), generating an output signal at Q, in response thereto. Number two flip-flop 39 is a D flip-flop or the like. However, it responds to signals at its data input terminal during the entire time a window signal is present at its clock input. Therefore, when the first positive transition of signal 89 occurs at the (D) input of number two flip-flop 39, the first assymetrical window signal 87 is present at the clock input of number two flip-flop 39, thereby causing the Q output of the flip-flop to go high. The Q will stay high during the second bit cell because another positive transition occurred within the time period of the second window signal. However, at the third window signal, no positive transition occurs (no binary one data signal is presented) at the (D) input of number two flip-flop 39 thereby causing the Q input to go to a binary zero or low. In this manner the Q output of number two flip-flop 39 will generate a signal 91 as illustrated at (h) of FIG. 4.

This signal 91 is supplied to the data (D) input of number three flip-flop 41. The number three flip-flop 41 receives the data clock signal generated by the variable frequency oscillator 25 (FIG. 1) at its clock (C) input. A Q output of number three flip-flop 41 generates the data pattern 93 illustrated at (*j*) of FIG. 4. This pulse pattern will readily be recognized as none-return-to-zero (NRZ) encoded data which represents the MFM encoded data recovered from the magnetic medium 11 (FIG. 1). The data pattern at the bottom of FIG. 4 illustrates that the data represented by the NRZ signal 93 is identical to what was recorded on the magnetic medium in MFM. This NRZ encoded data signal, on line 47, and the data clock signal, on line 45, is supplied to a well known NRZ decoding circuit (not shown) from where it is supplied to a data utilization circuit (not shown) in a data retrieval system.

To provide the optimum window position, the timing of the two monostable multivibrators 31 and 33 is manually adjusted at the time the data recovery system is set up and may be periodically adjusted during field servicing in the following manner. The recovered data may be monitored at the input to the NRZ decoding circuit or at the output of the NRZ decoding circuit to determine the data pattern being recovered, this data pattern being compared with the test pattern written onto the magnetic medium. In response to a comparison of the test pattern written and the data pattern recovered, the timing of the two monostable multivibrators 31 and 33 are adjusted to decrease the error ratio in the recovered data. This adjustment process continues until a minimum error ratio in the data recovery process is attained. Apparatus to perform comparison of a written test pattern and the pattern of recovered data and adjusting the time constant of the two monostable multivibrators 31 and 33 in response thereto, is seen as well within the purview of a person of ordinary skill in the art, and therefore will not be illustrated.

In view of the foregoing description of the preferred embodiment, it can be seen that a method and apparatus that is much simpler in approach and relatively uncomplicated in the circuit elements utilized has been provided for the detection of modified frequency modulated (MFM) encoded data retrieved from a storage medium. It should be understood, of course, the foregoing disclosure relates only to a preferred embodiment of the invention and that there are modifications contemplated that obviously will be resorted to by those skilled in the art without departing from the spirit and scope of the invention as hereinafter defined by the appended claims.

What is claimed is:

1. Apparatus used with data retrieval systems wherein binary data bits are stored within bit cells on a record medium at a base frequency as flux transitions, a first data bit value represented by a transition occurring at the middle of a bit cell and a second date bit value represented by a transition occurring at the beginning of a bit cell, except when the second bit value follows the first bit value, for detecting the first data bit values and the second data bit values recovered from the record medium, comprising:

means for generating a data window signal at said base frequency, the window signal having first and second timed portions at diverse voltage polarities, the first timed portions at one voltage polarity being longer in time than the second timed portions at another voltage polarity; and means for selectively displacing in time the first timed portions of the window signal and varying the length of the first timed portions of the window signal with respect to the length of the second timed portions of the window signal.

2. The apparatus of claim 1 wherein said data bit window signal generating means comprises:

a first monostable multivibrator responsive to a recovered data synchronized clock signal for establishing the start of the first timed portion of the data bit window signal; and a second monostable multivibrator connected to said first monostable multivibrator and responsive to the output of said first monostable multivibrator for establishing the end of the first timed portion of the data bit window signal.

3. The apparatus of claim 2 wherein said first timed portion selectively displacing and varying the length means comprises:

a first capacitor and variable resistor pair connected to said first monostable multivibrator to effectively vary its time constant; and a second capacitor and variable resistor pair connected to said second monostable multivibrator to effectively vary its time constant.

4. The apparatus of claim 1 further comprising:

means responsive to the output of said data bit window signal generating means and the data recovered from the record medium for representing each first data bit value by one polarity voltage and each stored data bit value by another polarity voltage, the voltage transitions occurring at the beginning and end of the bit cells.

5. The apparatus of claim 4 wherein said recovered data representing means comprises:

a first flip-flop responsive to the output of said data bit window signal generating means and the data recovered from the second medium; and a second flip-flop responsive to the output of said first flip-flop and the output of said data bit window signal generating means.

6. The apparatus of claim 4 further comprising:

means responsive to the output of said representing means and a recovered data clock signal for synchronizing the represented data from said representing means to the recovered data clock signal.

7. A method for recovering binary coded data in a data retrieval system wherein data bits are stored within bit cells, on a record medium, at a base frequency, as flux transitions, a first data bit value represented by a transition occurring at the middle of a bit cell and a second data bit value represented by a transition occurring at the beginning of a bit cell, except when the second bit value follows the first bit value, for identifying the first and second data bit values recovered from the record medium, comprising:

generating a data bit window signal at said base frequency, the window signal having first and second timed portions at diverse voltage polarities, the first timed portions at one voltage polarity being longer in time than the second timed portions at another voltage polarity; and selectively displacing in time and the first timed portions of the window signal in a positive or a negative direction until the error ratio in the data recovery process of said data retrieval system is at a minimum.

8. The method of claim 7 further comprising, after said displacing step, the step of:

varying the length of the first timed portion of the window signal with respect to the second timed portion of the window signal until the error ratio in the data recovery process of said data retrieval system is at a minimum.

9. The method of claim 7 wherein said data bit window signal generating step comprises:

signalling the start of the first timed portion of the data bit window signals in response to a recovered data synchronized clock signal; and signalling the end of the first timed portion of the dtat bit window signal in response to said signalling the start of the first timed portion step.

10. The method of claim 7 further comprising, after said displacing step, the step of:

converting the indicia of the data recovered from the record medium by representing each first data bit value by one polarity voltage and each second data bit value by another polarity voltage, the voltage transitions occurring at the beginning and end of the bit cells.

* * * * *

UNITED STATES PATENT OFFICE
CERTIFICATE OF CORRECTION

Patent No. 3,794,987 Dated February 26, 1974

Inventor(s) Ivan Earl Walenta

It is certified that error appears in the above-identified patent and that said Letters Patent are hereby corrected as shown below:

Column 1, line 25, "attandant" should be --attendant--; line 49, "encodes" should be --encoded--; line 49, "signal" should be --digital--; line 50 "or" should be --of--; line 53, "assemetrical" should be --assymetrical--; line 62, "assymertrical" should be --assymetrical--; line 63, "taken" should be --takes--. Column 2, line 8, "actors" should be --factors--. Column 3, line 5, "occurence" should be --occurrence--; line 21 "on" should be --or--; line 27, "row" should be --raw--; line 29, "coinicidence" should be --coincidence--; line 34, "generator" should be --greater--; line 50, after "phase" insert --lock--; line 51, "is" should be --in--; line 67, "desriable" should be --desirable--. Column 4, line 41, "check" should be --clock--; line 49, "response" should be --responds--. Column 5, line 40, "this" should be --thus--; line 61, "consider-ably" should be --considerably--; line 65, "assmytri-" should be --assymetri- --. Column 6, line 20, "flip-flp" should be --flip-flop--; line 26, "pluse" should be --pulse--; line 55, "interrationship" should be --interrelationship--. Column 7, line 8, "input" should be --output--; line 45, after "written" insert --data--. In the claims, column 8, line 1, "date" should be --data--; line 7, after "data" insert --bit--; line 43, "stored" should be --second--. Column 9, line 9, delete "and". Column 10, line 7, "dtat" should be --data--.

Signed and sealed this 1st day of October 1974.

(SEAL)
Attest:

McCOY M. GIBSON JR.
Attesting Officer

C. MARSHALL DANN
Commissioner of Patents